July 24, 1956     C. E. STROUD     2,755,518

SAFETY WINDOW CONSTRUCTION

Filed Feb. 10, 1953

INVENTOR.
CHARLES E. STROUD

BY
*Oscar L. Spencer*
ATTORNEY

United States Patent Office 2,755,518
Patented July 24, 1956

2,755,518

SAFETY WINDOW CONSTRUCTION

Charles E. Stroud, Tarentum, Pa., assignor to Pittsburgh Plate Glass Company, Allegheny County, Pa., a corporation of Pennsylvania Application February 10, 1953, Serial No. 336,059

5 Claims. (Cl. 20—40)

This invention relates to a laminated safety window construction suitable for use as a viewing closure, and has particular reference to a specific structural sealing element suitable for use in such a safety window construction to provide a resilient seal that is resistant to flow caused by temperature variations and the application of pressure from the opposing members of an enclosing window frame to which the window is subjected and which seal is also of sufficient rigidity to maintain a safety window within a frame such as the type utilized in Pullman and passenger cars presently in use on railroads.

The present invention is intended to be used with a conventional type of laminated safety glass window comprising a plurality of panes of glass having a layer of a thermoplastic transparent material such as vinyl butyral interposed between adjacent glass panes. The plastic interlayer extends beyond the edges of the glass sheet and is reinforced around the periphery and for a short distance within the periphery of the glass sheets with a ribbon of reinforcing material, the material most frequently used being aluminum.

It has been discovered that when such conventional safety glass windows are enclosed in a frame and put in service under conditions where the windows are subjected to wide fluctuations in temperature that the plastic material extending beyond the periphery of the glass panes is subject to a great deal of cold flow, which spoils the seal between the window and the frame, thereby allowing air and water to seep within the window closure. Another drawback of this type of construction is the inherent tendency of the interlayer to flow because of the pressure imparted to it on opposite sides due to the tensioning of the window frame against the window.

It is therefore an object of the present invention to provide a safety window construction that is provided with a sealing member having resistance to flow as the window and frame construction is exposed to wide ranges of temperature.

Another object of the present invention is to provide a resilient peripheral construction for a safety window that enables the window to form a seal that is water and air tight and sufficiently rigid to withstand shock when the window is used in service enclosed within a window frame.

These and other objects of the present invention will become apparent upon further study of the specification taken in conjunction with the accompanying drawing. It is to be understood, however, that the scope of the invention is limited only by the appended claims and not by the limits of the specific embodiment disclosed herein for illustrative purposes only.

Figure 1:
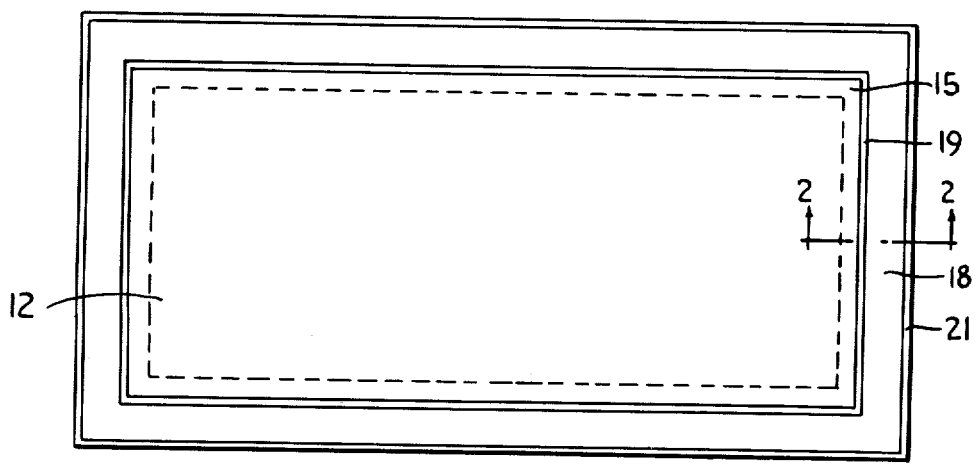
Figure 1 represents a plan view of a safety glass window embodying the teaching of the present invention.
Figure 2:
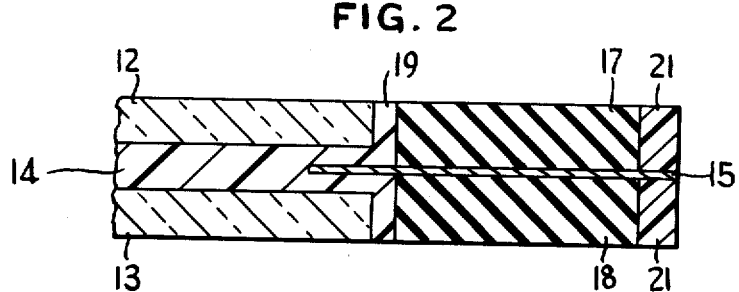
Figure 2 is a transverse cross-sectional view taken along the lines 2—2 of a portion of the periphery of the device shown in Figure 1.

Referring to the drawings, reference numerals 12 and 13 refer to a pair of glass plates having an interlayer 14 of a plastic material such as vinyl butyral therebetween. A ribbon of reinforcing material 15 extends completely around the periphery of the plastic interlayer 14 and extends inwardly of the peripheral edges of glass sheets 12 and 13. A pair of rubber framing sections 17 and 18 are cemented to both sides of the reinforcing member 15 about the periphery of the glass sheets 12 and 13 by means of any suitable rubber to metal cement such as an epoxide resin.

In order to minimize "cold chipping" of the glass surfaces adjacent the plastic interlayer 14 due to the more rapid contraction of the plastic than the glass when exposed to low temperatures, and also to provide a suitable contact surface for the inner peripheral surface of the rubber framing sections 17 and 18, it is recommended that thin plastic bumper strips 19 of polyvinyl butyral be kept in place between the outer peripheral edges of glass sheets 12 and 13 and the inner peripheral edges of rubber framing members 17 and 18. In order to protect the outer peripheral edges of the rubber framing members against displacement or peeling and in order to facilitate mounting of the assembly within a frame, it is preferable that peripheral framing members 21 of a plastic material such as polyvinyl butyral be provided surrounding the rubber framing members 17 and 18.

A typical safety window used in Pullman cars comprises glass sheets 56 inches long by 36 inches wide and 1/8 inch thick separated by a 1/8 inch thick layer of polyvinyl butyral reinforced by a solid band of aluminum 7/8 inch wide and .032 inch thick extending 1/4 inch within the periphery of the glass sheet. On opposite sides of the aluminum reinforcing member of such a typical safety window was placed a pair of natural rubber framing members 7/16 inch wide and of sufficient thickness to render the thickness of the assembly in the vicinity of the rubber framing members equal to that of the safety glass assembly itself. A first bumper strip of polyvinyl butyral about 1/16 inch thick was interposed between each rubber framing member and the periphery of each glass panel comprising the laminated assembly to form a tight seal. A second strip of polyvinyl butyral about 1/8 inch thick was placed around the outer periphery of each of the rubber framing members to prevent the latter from peeling away from the aluminum reinforcement. Units having such a configuration have been tested and found to be free from the deficiencies present in assemblies having only reinforced polyvinyl butyral peripheral portions surrounding the glass panel sections.

While a specific embodiment including the present invention has been described hereinabove, it is to be understood that various obvious modifications may be made within the scope of the present invention. For example, the shape of the safety window may be round or irregular rather than the rectangular shape disclosed in the drawing. In addition, the rubber framing members 17 and 18 may be composed of a plurality of strips that must be vulcanized at their joints in order to provide the required sealing characteristics. In lieu of rubber for the framing members 17 and 18, various synthetic rubbers and other resilient materials that are resistant to the flow of water vapor may be substituted.

It is further understood that the rubber to metal seal may be accomplished by other obvious mechanical equivalents of cementing than the use of epoxide resins. Furthermore, the reinforcements 15 may be of a material other than the metal or aluminum specifically recited, for example a silicone-treated textile fabric. In addition, while a safety glass window construction was specifically disclosed, it is understood that the scope of this invention also includes other transparent closure members of the safety type such as those embodying a pair of synthetic resin sheets interposed by a layer of thermoplastic material.

The common denominator of all these variations is the provision of a gasket member surrounding a laminated safety window closure unit, that is resilient, free from flow caused by pressure and cold, resists the passage of water, provides a good bond to the laminated safety unit and seals tightly against a frame for the window closure.

What is claimed is:

1. A transparent closure member comprising a pair of transparent sheets of material bonded to an interlayer of transparent thermoplastic material, a reinforcing member extending beyond the peripheral edge of the thermoplastic material, a pair of resilient, moisture-resistant framing members of a material not subject to cold or pressure flow surrounding the periphery of the laminated structure and secured on opposite sides to said reinforcing member, and thin strips of polyvinyl butyral attached on opposite peripheries of said framing members to provide a bond between the transparent sheets and the inner peripheries of the framing members and a protective covering for the outer peripheries of the framing members.

2. A laminated safety window construction comprising a plurality of panes of glass, a layer of thermoplastic material secured between said adjacent panes of glass, a reinforcing member embedded around the periphery of the layer, a frame member of thermoplastic material of a thickness equal to the combined thickness of the panes and the layer secured about said panes, an extension for said reinforcing member extending beyond the periphery of said layer and the frame member, a frame of resilient material that is not subject to cold or pressure flow secured on either side of said extension, said frame member secured about its periphery to said frame, and a peripheral strip of thermoplastic material surrounding the periphery of the frame.

3. A laminated safety window construction comprising a plurality of panes of glass, a layer of polyvinyl butyral secured between said adjacent panes of glass, a frame member of polyvinyl butyral of a thickness equal to the combined thickness of the panes and the layer and secured about said panes, a reinforcing member embedded around the periphery of the layer and within the frame member and extending to within the periphery of the glass, an extension for said reinforcing member extending beyond the periphery of said frame member, a frame of resilient, water-resistant material that is not subject to cold flow secured on either side of said extension, said frame member secured about its periphery to said frame, and a peripheral strip of thermoplastic material surrounding the periphery of the frame.

4. A laminated safety window construction comprising a pair of glass sheets, a layer of plastic material secured therebetween and extending slightly beyond the peripheries of the glass sheets to form a marginal portion of a thickness equal to the combined thickness of the sheets and the layer, a flat, thin metallic reinforcing member within the plastic layer and extending beyond the edge of the plastic interlayer with its plane of largest area extending in a plane parallel to the plane of largest area of said plastic layer, rubber framing members attached to either side of the marginal portion of said reinforcing member in close adjacency to the peripheries of said glass sheets, adhesive means for uniting the framing members to said marginal portion and means surrounding the peripheries of said framing members to prevent peeling of said framing members from said extensions.

5. A laminated safety window construction comprising a pair of glass sheets, a layer of thermoplastic material of uniform thickness secured therebetween and extending slightly beyond the peripheries of said glass sheets to form a marginal portion having a thickness equal to the combined thickness of the sheets and the layer, a thin peripheral sheet of aluminum disposed centrally of the thickness of the thermoplastic layer and extending from beyond the periphery of said layer to within the peripheries of said glass sheets, and a rubber framing member surrounding each glass sheet and disposed on each side of the aluminum sheet, said layer of thermoplastic material including a thin strip of thermoplastic material adhering the periphery of each glass sheet to its adjacent rubber framing member and an additional strip of thermoplastic material disposed about the periphery of each rubber framing member and bonded thereto.

References Cited in the file of this patent

UNITED STATES PATENTS

| 2,302,740 | Boicey | Nov. 24, 1942 |
| 2,403,061 | Downes | July 2, 1946 |

Dedication 2,755,518.—*Charles E. Stroud*, Tarentum, Pa. SAFETY WINDOW CONSTRUCTION. Patent dated July 25, 1956. Dedication filed July 25, 1973, by the assignee, *PPG Industries, Inc.*

Hereby dedicates for the remainder of its term to the free use and benefit of the People of the United States.

[*Official Gazette January 8, 1974.*]